No. 891,080. PATENTED JUNE 16, 1908.
C. H. KROGH.
BENCH DOG.
APPLICATION FILED JULY 15, 1907.

WITNESSES
F. C. Barry
Perry B. Turpin

INVENTOR
CHRISTOPHER H. KROGH
BY Munn & Co.
ATTORNEYS.

UNITED STATES PATENT OFFICE.

CHRISTOPHER HANSEN KROGH, OF LINCOLN, NEBRASKA.

BENCH-DOG.

No. 891,080.  Specification of Letters Patent.  Patented June 16, 1908.

Application filed July 15, 1907. Serial No. 383,785.

*To all whom it may concern:*

Be it known that I, CHRISTOPHER HANSEN KROGH, a citizen of Denmark, having made his application and declaration to become a citizen of the United States, and a resident of Lincoln, in the county of Lancaster and State of Nebraska, have invented certain new and useful Improvements in Bench-Dogs, of which the following is a specification.
My invention is an improvement in bench dogs for use on work benches in holding the work while it is being planed or otherwise operated on; and the invention consists in certain novel constructions and combinations of parts as will be hereinafter described and claimed.

Figure 1:
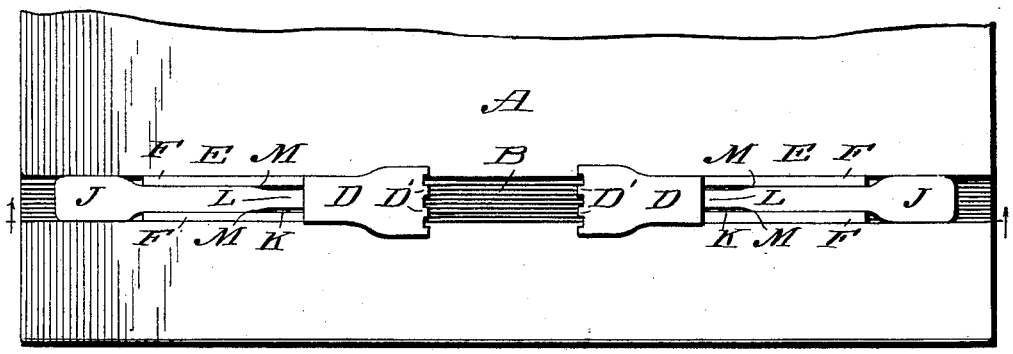
Figure 2:
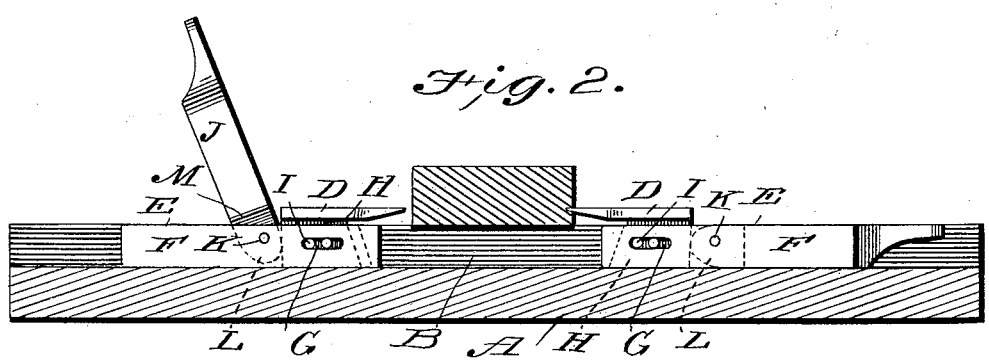
Figure 3:
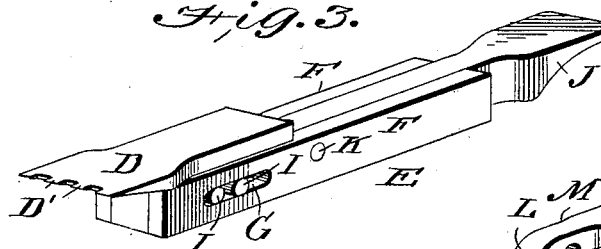
Figure 4:
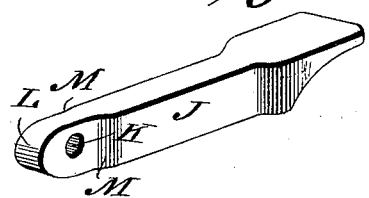
Figure 5:
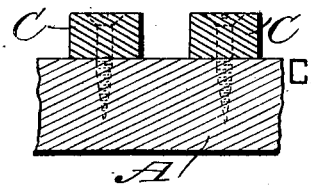

In the drawings, Figure 1 is a top plan view of my invention as in use, the bench being partly broken away. Fig. 2 is a longitudinal section drawn alongside the bench dogs and illustrating one of the dogs in engagement with the work and the other dog in position to be forced into such engagement. Fig. 3 is a detail perspective view of the improved device. Fig. 4 is a detail view of the lever, and Fig. 5 illustrates a modification in the means for providing the groove or way for the bench dog.

In carrying out the invention, I provide in connection with the dog proper, the carrier therefor, and a device for operating the dog, which device also operates to bind the carrier in any suitable position to which it may be adjusted; and in the construction shown I make the dog carrier in two side sections which may be spread apart to bind them in a groove provided in the bench and the device for operating the dog is in the form of a lever pivoted between the side pieces of the carrier and constructed when operated to move the dog into engagement with the work to spread the carrier in such manner as to bind it in the groove provided therefor in the bench.

The bench A is provided with a groove in which the dog carrier may be held and along which it may be adjusted to any suitable position. In Figs. 1 and 2, this groove B is secured by channeling the upper surface of the bench, while in Fig. 5, I secure the way or groove by securing separate strips C upon the upper face of the bench and spaced apart a proper distance to receive the carrier of the dog between them.

The dog D is toothed at D' to engage with the work to be operated on, and is slidably connected with the carrier E so the dog may be adjusted between the positions shown at the right and left in Fig. 2. The carrier E is preferably composed of the side bars F secured together at one end and spaced apart at their other ends. These bars F are slotted longitudinally at G near their connected ends and the dog D is provided with a depending lug H which fits between the side bars F and is provided with lateral projections or lugs I operating in the slots G so the dog may be moved in the direction of length of the carrier by the operating device presently described.

The carrier fits in the groove of the bench and an operating device is provided for moving the dog longitudinally and for spreading the carrier to clamp it in any desired position within the groove. As shown, the dog operating device is provided by a lever J pivoted at K to the carrier immediately in rear of the dog and having its short arm L arranged to operate against the rear end of the dog bearing directly upon the lug H and the lever gradually widens from that portion which fits between the side bars of the carrier when the lever is raised so that when the lever is pressed from the elevated position shown in Fig. 2 to the lowered position shown in the same figure, the inclined surfaces at M will operate to spread the side bars of the carrier and thus bind the carrier in position in connection with the bench. Thus, by one operation of lowering the lever it serves to press the dog into engagement with the work desired to be held and also to bind the carrier of said dog in place in the groove provided therefor in the bench.

It will be understood that in practice the groove in the bench is designed to be made of sufficient depth to receive the carrier so that only the dog will project above the face of the bench when the operating device is lowered to set the dog into engagement with the work, as will be understood from the drawings and foregoing description.

I claim—

1. A bench dog substantially as herein described, comprising a carrier having the opposite side bars connected together at one end and arranged to be spread at their outer ends, a dog having a lug sliding between said bars at the connected end thereof and a lever pivoted between the opposite bars of the carrier and arranged at one end to engage and operate the dog and gradually widening from its pivotal connection with the carrier whereby it may spread the carrier bars when actuated to position between the said bars, substantially as set forth.

2. A bench dog comprising a carrier having opposite side bars, a dog slidable relatively to said carrier, and a lever pivoted to the carrier and arranged to operate the dog and to spread the carrier substantially as and for the purposes set forth.

3. A bench dog comprising a carrier, a dog slidable relatively to the carrier and a lever pivoted to the carrier and arranged to operate the dog and having a portion engaging with the carrier whereby to bind the same in place, substantially as set forth.

4. The combination of a bench, a dog, a carrier adjustable along the bench, a dog operating device having means for spreading the carrier whereby to secure the same in any desired position.

5. The combination with a bench having a groove a carrier adapted to be spread in such groove and a dog slidable relatively to the carrier, of a lever mounted in the carrier and having means whereby to operate the dog and having an inclined surface whereby to spread the carrier, substantially as set forth.

6. The combination of a carrier having side bars provided with longitudinal slots, a dog having a depending lug fitting between said side bars and provided with projections entering the slots in the side bars of the carrier, and a lever pivoted between the side bars of the carrier and having an arm to operate the dog and a handle arm inclined to operate upon and spread the carrier, substantially as set forth.

CHRISTOPHER HANSEN KROGH.

Witnesses:
 FRED BECKMANN,
 F. B. SIDLES.